US011605030B1

(12) United States Patent
Vijayvargiya (10) Patent No.: US 11,605,030 B1
(45) Date of Patent: *Mar. 14, 2023

(54) VIEWING SEGMENTS OF EVENT MEDIA

(71) Applicant: Amazon Technologies, Inc., Seattle, WA (US)

(72) Inventor: Ketan Vijayvargiya, Sabarmati (IN)

(73) Assignee: Amazon Technologies, Inc., Seattle, WA (US)

( * ) Notice: Subject to any disclaimer, the term of this patent is extended or adjusted under 35 U.S.C. 154(b) by 564 days.

This patent is subject to a terminal disclaimer.

(21) Appl. No.: 16/783,351

(22) Filed: Feb. 6, 2020

Related U.S. Application Data

(63) Continuation of application No. 14/499,596, filed on Sep. 29, 2014, now Pat. No. 10,565,530.

(51) Int. Cl.
| | |
|---|---|
| *G06F 21/10* | (2013.01) |
| *G06Q 10/02* | (2012.01) |
| *G06Q 20/42* | (2012.01) |
| *H04L 67/10* | (2022.01) |
| *G11B 20/00* | (2006.01) |

(52) U.S. Cl.
CPC ............ *G06Q 10/02* (2013.01); *G06F 21/10* (2013.01); *G06Q 20/42* (2013.01); *G11B 20/00746* (2013.01); *H04L 67/10* (2013.01)

(58) Field of Classification Search
CPC ........ G06F 21/10; G06Q 10/02; G06Q 20/42; H04L 67/10; G11B 20/00746
USPC .......................................................... 726/33
See application file for complete search history.

(56) References Cited

U.S. PATENT DOCUMENTS

| | | | |
|---|---|---|---|
| 7,865,567 B1 * | 1/2011 | Hendricks | .............. G06Q 30/06 |
| | | | 709/219 |
| 8,010,623 B1 | 8/2011 | Fitch et al. | |
| 8,108,687 B2 | 1/2012 | Ellis et al. | |
| 8,464,066 B1 * | 6/2013 | Price | .................. H04N 21/4784 |
| | | | 713/180 |
| 2003/0126595 A1 | 7/2003 | Sie et al. | |
| 2006/0173701 A1 | 8/2006 | Gurvey | |

(Continued)

OTHER PUBLICATIONS

Freeman, Run Pee App Ensures You'll Never Miss Big Scenes at the Movies, Mashable.com, Oct. 25, 2012.

(Continued)

*Primary Examiner* — Samson B Lemma
(74) *Attorney, Agent, or Firm* — Lee & Hayes, P.C.

(57) ABSTRACT

Techniques for providing segments of media items associated with events to users are described herein. Computing device(s) may receive from a user a request for a segment of a media item associated with an event. The computing device(s) may also receive data presented as evidence of acquisition of a pass for the event, verify that the data is associated with a valid pass that has been purchased for the event, and, based on the verifying, provide the segment of the media item to the user. Additionally or instead, the request may include a time length for the segment and/or a beginning position of the segment, and the computing device(s) may determine, based on a policy and one the time length and/or beginning position, a part of the requested segment of the media item to provide. The computing device(s) may then provide the determined part of the segment to the user.

20 Claims, 5 Drawing Sheets

(56) References Cited

U.S. PATENT DOCUMENTS

| | | | |
|---|---|---|---|
| 2007/0038873 A1* | 2/2007 | Oliveira | H04L 9/0822 713/193 |
| 2007/0239785 A1 | 10/2007 | Duncombe et al. | |
| 2007/0276707 A1 | 11/2007 | Collopy et al. | |
| 2008/0183805 A1* | 7/2008 | Cancel | G06Q 30/02 709/203 |
| 2008/0320543 A1* | 12/2008 | Wang | H04N 21/4122 725/131 |
| 2009/0006583 A1* | 1/2009 | Kindle | H04N 7/17318 709/220 |
| 2012/0042253 A1* | 2/2012 | Priyadarshan | G06Q 30/02 715/733 |
| 2012/0066059 A1 | 3/2012 | Berger | |
| 2012/0197419 A1* | 8/2012 | Dhruv | H04N 21/26258 700/94 |
| 2012/0290340 A1* | 11/2012 | Ramanujam | G06Q 10/101 705/5 |
| 2014/0013003 A1* | 1/2014 | Giladi | H04N 21/2541 709/231 |
| 2014/0161417 A1* | 6/2014 | Kurupacheril | H04N 21/4828 386/241 |
| 2015/0063789 A1 | 3/2015 | Tsai | |
| 2015/0262278 A1 | 9/2015 | Lin-Hendel et al. | |
| 2016/0294909 A1* | 10/2016 | Killick | H04L 51/046 |

OTHER PUBLICATIONS

Google Search, 1 page.
Final Office Action dated Jan. 23, 2019 for U.S. Appl. No. 14/499,596 "Viewing Segments of Event Media" Vijayvargiya, 12 pages.
Office Action for U.S. Appl. No. 14/499,596, Vijayvargiya, "Viewing Segments of Event Media", 25 pages.
Office Action for U.S. Appl. No. 14/499,596, dated May 18, 2018, Vijayvargiya, "Viewing Segments of Event Media", 29 pages.
Office Action for U.S. Appl. No. 14/499,596, dated May 2, 2017, Vijayvargiya, "Viewing Segments of Event Media", 16 pages.
Office Action for U.S. Appl. No. 14/499,596, dated Jun. 10, 2019, Vijayvargiya, "Viewing Segments of Event Media", 11 pages.
STIC Search Report, completed Apr. 4, 2017, 17 pages.

\* cited by examiner

VIEWING SEGMENTS OF EVENT MEDIA

CROSS-REFERENCE TO RELATED APPLICATION

This patent application is a continuation of and claims priority to U.S. Utility patent application Ser. No. 14/499,596, filed Sep. 29, 2014, which is fully incorporated herein by reference.

BACKGROUND

In a world of increasing distractions and activities, it is often difficult to select among competing demands and opportunities. For example, moviegoers often arrive late at shows, missing critical initial minutes for which they have paid increasingly higher ticket prices. Those purchasing tickets for and attending other events face similar challenges; life often intervenes, causing the attendees to miss the beginning, middle, or end of their events. Such events may include movie showings, concerts, sporting events, plays, musicals, webcasts or any event for which a ticket is purchased. It is also difficult to select among different event opportunities. Moviegoers, for instance, may view trailers for multiple movies to select a movie to see in the theater, but trailers are often misleading. The result of these difficulties is often frustrating repeat ticket purchases. A person who missed the beginning of a movie may purchase tickets to it a second time, catching the part that the person missed, and a person trying to select a movie based on trailers may attend multiple movies, leaving early from those that prove unsatisfying. The result of using repeat purchases as remedies for the above-mentioned difficulties is to exacerbate demands on time and resources, making those difficulties even more likely to recur.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for providing users segments of media items associated with events. One or more computing devices of a service provider may receive a request from a user for a segment of a media item associated with an event. The service provider may also receive data presented as evidence of a valid acquisition of a pass (e.g., valid purchase of a ticket, valid use of a subscription number or rewards card, etc.) for the event, either with the request or separately. The service provider may then verify that the data is associated with a valid acquisition for the event and, based at least partly on the verifying, provide the segment of the media item to the user. Additionally or instead, the request may include a time length for the segment and/or a beginning position of the segment within the media item, and the service provider may determine, based on a policy and the time length and/or beginning position, a part of the requested segment of the media item to provide to the user. The service provider may then provide the determined part of the segment of the media item to the user.

For example, a user may purchase a ticket to a movie, concert, sport event, etc. The user may miss part of that event—or wish to preview it—and, utilizing a user computing device, may request a segment of a media item associated with the event that corresponds to the part missed or to be previewed. The user may also provide evidence of the purchase of a ticket for the event. A service provider may receive the request and evidence, verify the evidence, and provide the requested segment to the user through the user computing device.

In another example, a user may wish to view a segment of a media item associated with an event, and the user may or may not have acquired a pass for that event. Based on a policy, however, all or part of the segment may be made available to the user via his or her user computing device upon request, either for fee, for service membership, or otherwise. A service provider may receive an electronic request for the segment from the user, determine a part that may be provided to the user based on the policy and on a time length or beginning segment position indicated in the request, and electronically provide the determined part of the segment to the user for presentation of the user computing device. Such a policy may result, for example, from movie producers that wish to make parts of their movies available in order to increase ticket sales.

Figure 1:
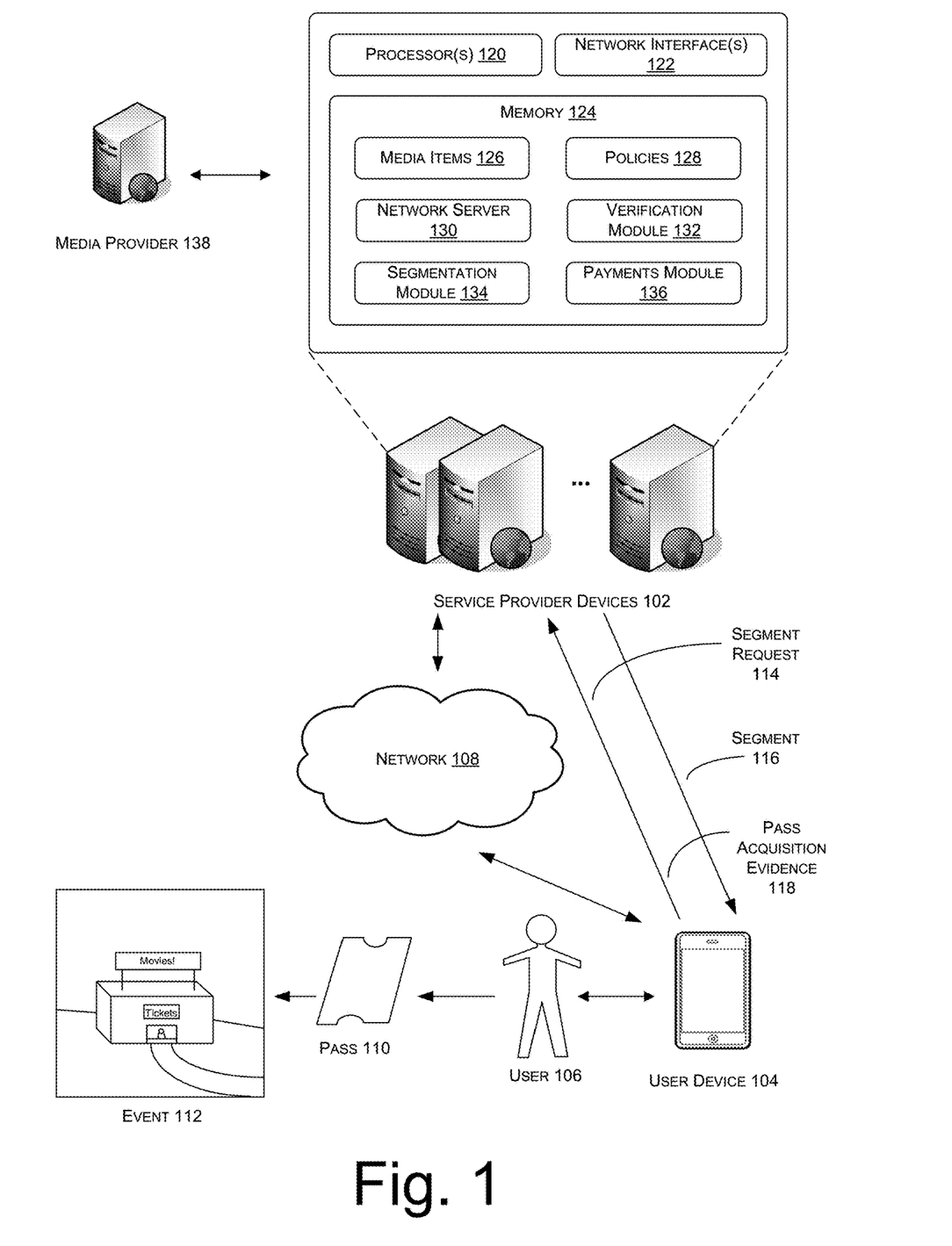
FIG. 1 shows an illustrative network environment in which a service provides segments of media items associated with events to users responsive to user requests for those media items, the requests accompanied by at least one of evidence of acquisition of passes for the events, time lengths for the segments, or beginning positions of the segments within the media items.

FIG. 1 illustrates an example network environment in which a service provides segments of media items associated with events to users responsive to user requests for those media items, the requests accompanied by at least one of evidence of acquisition of passes for the events, time lengths for the segments, or beginning positions of the segments within the media items. As illustrated, one or more service provider computing devices 102 (hereinafter "server provider devices 102") of a service provider may be connected to a user computing device 104 (hereinafter "user device 104") associated with a user 106 via a network 108. The user 106 may have acquired a pass 110 (e.g., electronic ticket, physical ticket, subscriber information, rewards card, etc.) to an event 112 and may request 114, via the user device 104, a segment 116 of a media item associated with the event 112. The user 106 may also provide data 118 presented as evidence of acquisition of the pass 110. Also or instead, the user 106 may request 114 a segment 116 of a media item associated with an event 112 for which the user 106 has not acquired a pass 110. The service provider devices 102 may receive the request 114, and, in some implementations, data 118, and may provide the segment 116 in response. The service provider devices 102 may include processor(s) 120, network interface(s) 122, and memory 124. The memory 124 may store media items 126, policies 128, a network server 130, a verification module 132, a segmentation module 134, and a payments module 136. The service provider devices 102 may receive any or all of the segment 116, the media items 126, or the policies 128 from a media provider 138.

In various embodiments, the service provider devices 102 and user devices 104 may each be a computing device, such as a personal computer (PC), a laptop computer, a server, a server farm(s), a mainframe, a tablet computer, a work station, a telecommunication device, a personal digital assistant (PDA), a media player, a media center device, a personal video recorder (PVR), a television, an electronic book reader, a set-top box, a camera, a video game console, a wearable computing device, a kiosk, a gaming device, processor(s), integrated components for inclusion in a computing device, an appliance, an electronic device for inclusion in vehicles, a gaming device, or any other sort of device.

The service provider associated with the service provider devices 102 may provide any sort of services. For example, the service provider may be an entity that hosts or provides the event 112, such as a movie theater company, or a concert venue. In other examples, the service provider may sell the pass 110 or otherwise provide the pass 110 on behalf of the event provider/host or provide access to media item segments 116 on behalf of the event provider/host. In further examples, the service provider may not be affiliated with any event provider/host or verify passes 110. In such examples, the service provider may, for instance, provide access to different parts of a media item at different price levels.

The user device 104 of the user 106 may be any sort of device capable of connecting to the network 108, of making the request 114, and of receiving and playing the segment 116. For example, the user device 104 may have a browser or other client application that is capable of connecting to the service provider devices 102 through the network 108 and generating user interfaces, such as network pages, from those service provider devices 102. The user device 104 may further have a display and one or more input mechanisms to enable the user 106 to interact with the user interfaces received from the service provider devices 102.

In some implementations, the network 108 may be any sort of network or networks that connect the service provider device 102 and user device 104, as mentioned above. The network 108 may also connect the service provider devices 102 and the media provider 136, in some implementations. Also, the network 108 may connect any of the service provider devices 102 and user device 104 to other devices. The network 108 may be any type of network, such as a wide area network (WAN), a local area network (LAN), or the Internet. Also, the network 108 may be public, private, or include both public and private networks. Further, the network 108 may be wired, wireless, or include both wired and wireless networks. The network 108 may utilize any one or more protocols for communication, such as the Internet Protocol (IP), other packet based protocols, or other protocols. Additionally, the network 108 may comprise any number of intermediary devices, such as routers, base stations, access points, firewalls, or gateway devices.

The user 106 may acquire a pass 110 to any sort of event 112. Example events 112 may include movie showings, concerts, sporting events, plays, speeches, festivals, rallies, conventions, fairs, musicals, webcasts, etc. Such an event 112 may play an associated media item (as in the case of a movie showing) or may be recorded as a media item (e.g., a recording of a live sports event or musical). The user 106 may acquire a pass 110 at an event venue, at a ticket office or on a network site. Such a network site may be associated with the event venue operator/owner or with a third party that may sell or otherwise provide the pass 110 on behalf of the event venue operator/owner. The pass 110 may have an identifier such as a textual code, a graphic, a tag (e.g., a radiofrequency identification (RFID) tag or near field communication (NFC) tag), or a machine readable code (e.g., an optical code, a one-dimensional (1D) bar code, a two-dimensional (2D) bar code, etc.) or an image (e.g., of the pass of any of the foregoing). Examples of a 2D bar code (which may also be referred to as a "matrix code") include, but are not limited to a QR® code or "quick response" code, an EZCode® bar code, a PDF417 or "portable data file" bar code, a high capacity color bar code, etc. The idea may be entered as text, scanned, photographed or otherwise electronically or optically input. Also, the pass 110 may be purchased or acquired in conjunction with a customer rewards card or other consumer card that may be used to track and identify purchases. In some examples, the pass 110 may be a customer rewards card or other consumer card. For example, the pass 110 may be purchased from a movie theater owner/operator that has a customer rewards card that is scanned at the time of purchasing the pass 110.

With purchase or other acquisition of the pass 110, the user 106 may or may not attend the event 112. If attending, the user 106 may miss part of the event 112, such as the first few minutes if arriving late, or the last few minutes if needing to leave early. The user 106 may also miss any part of the event 112 if, for instance, the user 106 is interrupted from the event 112. These missed parts of the event 112, or simply a desire to view again a certain part, may motivate a user 106 to request 114 a segment 116 of a media item associated with that event 112. Such a segment 116 may correspond to the part that the user 106 desires to view or may be a highlight reel or summary of that part. The media item associated with the event 112 may be a media item played at the event 112, may be a recording of the event 112, or may be a recording of another instance of the event 112 (e.g., a previous showing of a musical rather than the showing for which the pass 110 was purchased).

In some implementations, the user 106 may initiate the request 114 by accessing a user interface on the user device 104. Such a user interface may be a network page provided by a service provider device 102 or a user interface of a client application executing on the user device 104 that is configured to facilitate communication with the service provider devices 102. The user interface may comprise a succession of interfaces, each seeking one or more pieces of information or may be a single interface.

The user interface may prompt the user 106 to login to an account or allow the user 106 to continue without logging into an account. For example, the user 106 may subscribe to a service offered by the service provider which may enable the user 106 to obtain the segment 116 either free of additional cost (beyond any fees for the service) or at a rate discounted in comparison to that paid by non-subscribers.

The user interface may further enable the user 106 to indicate which media item that the user is interested and what part of that media item the user 106 wishes to obtain. The user interface may enable the user 106 to indicate the media item by providing a search field, selectable links, a drop down list, radio buttons, etc. Upon receiving indication of the media item, or without receiving any indication, the user interface may display segmentation options available for that media item. For example, the user interface may enable the user to specify or select any segment 116 of the media item having a length not exceeding a predetermined threshold amount of time (e.g., 90 seconds, 20 minutes, etc.) in any location within the media item. In other examples, parts of the media item may be unavailable or may only have a highlight reel or highlight summary (hereinafter "summary") available that includes only certain portions of the event that may be of interest or significance, e.g., action sequences, plot points, scoring drives, etc. Accordingly, a summary may include clips or scenes within a specified segment 116. For instance, a summary of the first 20 minutes of a movie may include two minutes of significant scenes from the first 20 minutes. In some examples, both a segment 116 and a summary for that segment may be available, and the user interface present an option to the user 106 to select between the segment 116 itself and a summary.

In some implementations, the user interface may present a list of media items for which the user 106 has purchased/acquired passes 110. The list may be presented through the user interface responsive, for example, to the user 106 logging into an account of the service provider. The items media items listed may include, for example, those for which the service provider sold/provided the passes 110.

The user interface may further prompt the user 106 to enter data to present as evidence of acquisition of a pass (e.g., purchase of a ticket). Such data may include pass information (e.g., a ticket number) or customer rewards card number that may be entered into a textual field of the user interface. Also or instead, the user interface may prompt the user 106 to initiate scanning or other capture of a bar code or other identifier utilizing the user device 104. For example, the user may utilize an imaging device with which the user device is equipped (e.g., a camera on a smartphone) to capture an image of the pass and transmit the image to the service provider device 102 or media provider device 138.

Further, the user interface may prompt the user 106 to select a pricing option for purchasing an opportunity to view the segment 116. The options presented may depend on the media item, time length, beginning position, segment type (full segment or summary), whether the user 106 subscribes to a service, or whether the user 106 has redeemable credits (e.g., credits associated with a customer rewards card). In other examples, pre-set options may be presented to the user 106. The user 106 may then use the user interface to select a pricing option. In some examples, the pricing presented to the user 106 may be non-linear, with, for instance, a 2 minute segment 116 having a lower price (e.g., $1.00) and a 5 minute segment 116 having a higher price (e.g., $10.00).

Upon entering and selecting the information requested by the user interface, the user 106, utilizing the user device 104, may submit the information as the request 114 and pass acquisition evidence 118, as a single communication or as multiple communications, through the network 108 to the service provider devices 102.

Figure 2:
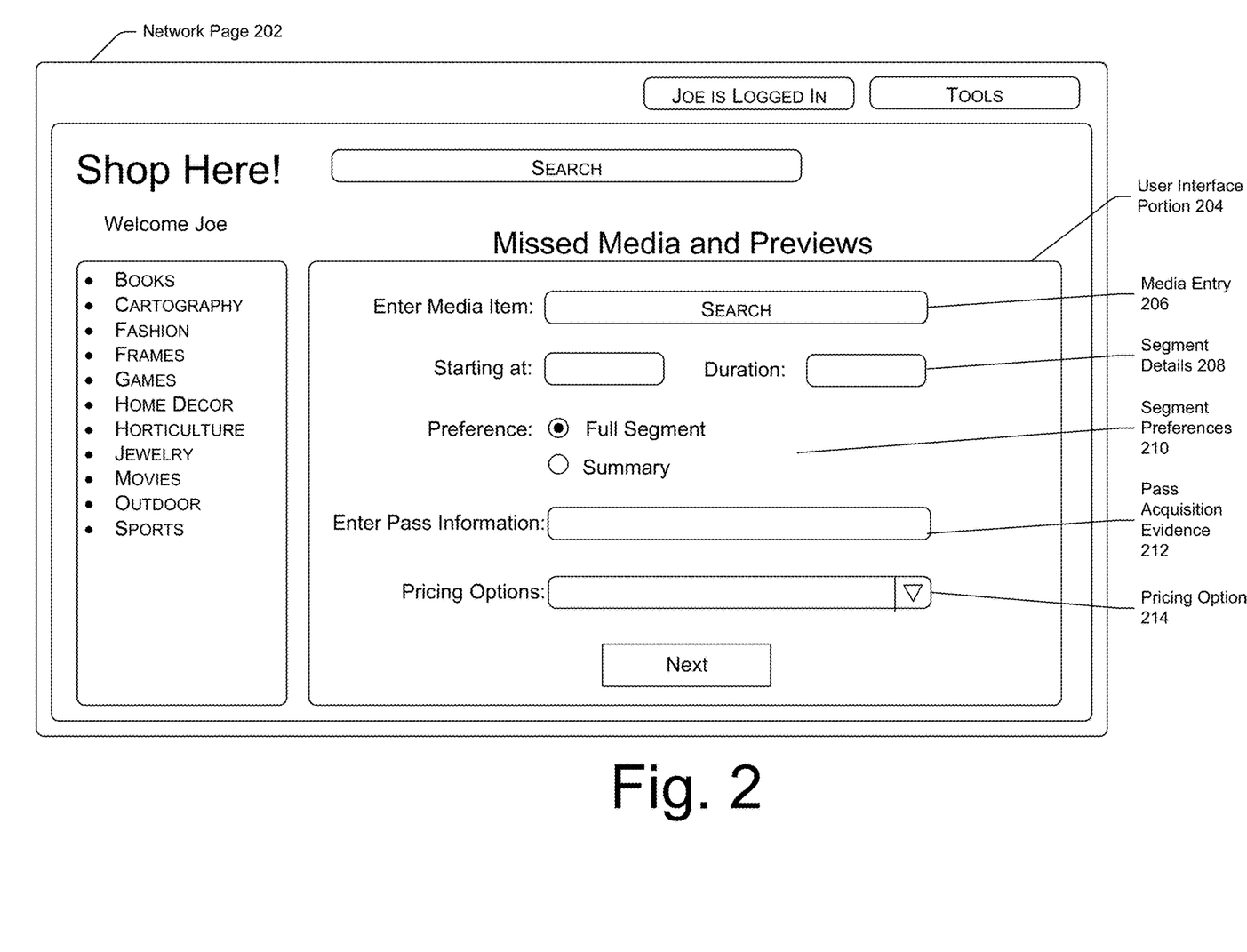
FIG. 2 shows an illustrative graphic user interface of a service that enables a user presenting evidence of acquisition of a pass for an event to request and receive a segment of a media item associated with that event.

FIG. 2 illustrates an example graphic user interface generated by a service provider device 102 that enables a user 106 to request 114 and receive a segment 116 of a media item associated with that event 112. As illustrated, the graphic user interface may be a network page or an application (referred to hereinafter as "network page 202") provided by the service provider device 102. The network page 202 may include a user interface portion 204 for requesting 114 the segment 116 as well as a number of other elements, such as a browsing window with categories, information identifying the service provider, information indicating that the user 106 is logged in, a search field, and a link to one or more tools. The user interface portion 204 may include a media entry portion 206 for a user 106 to textually enter (if a text box) or select (if a drop-down menu) a media item. The user interface portion 204 may also include a segment details portion 208 for a user 106 to indicate at least a beginning position of the segment 116 within the media item or a time length/duration. Further, the user interface portion 204 may include a segment preferences portion 210 for a user 106 to indicate whether the user 106 prefers to receive a full segment 116 or a summary of the segment 116. The user interface portion 204 may also include a pass acquisition evidence portion 212 for a user 106 to enter pass information, a customer rewards card number, or other information or files (e.g., a pass image). Also, the user interface portion 204 may include a pricing options portion 214 for a user 106 to select among pricing options for different segment types or lengths. Depending on user entries in other parts of the user interface portion 204, the pricing options portion 214 may be populated with a specific price. The user interface portion 204 may also include a control, such as a "next" button, to cause submission of the information entered through the user interface portion 204.

Figure 3:
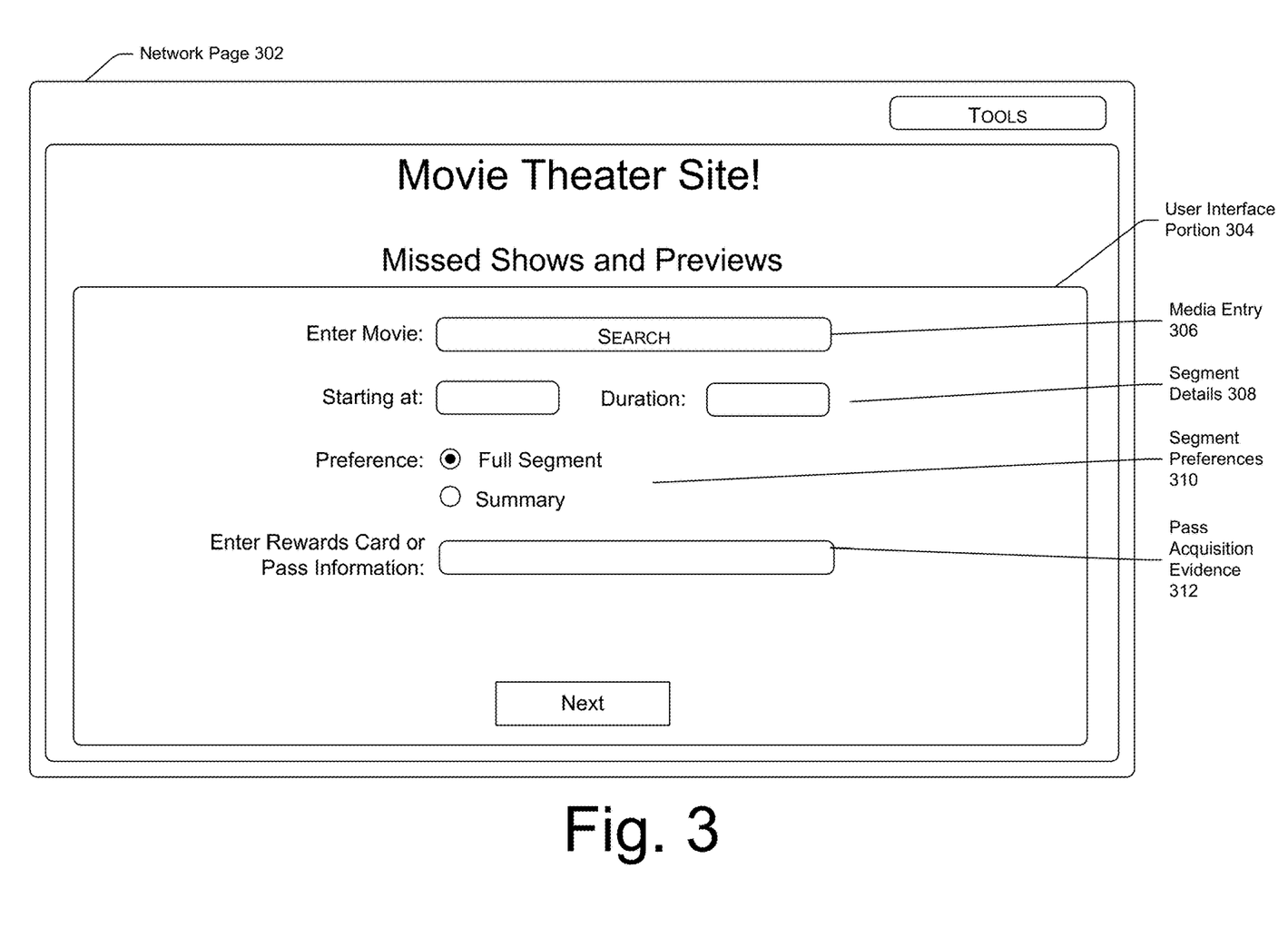
FIG. 3 shows an illustrative graphic user interface of an event venue provider that enables a user presenting evidence of acquisition of a pass for an event of the event venue provider to request and receive a segment of a media item associated with that event.

FIG. 3 illustrates an example graphic user interface of an event venue provider that enables a user 106 to request 114 and receive a segment 116 of a media item associated with that event 112. As illustrated, the graphic user interface may be a network page or an application (referred to hereinafter as "network page 302") provided by the service provider devices 102, which may be devices of the event venue provider, such as a movie theater operator/owner. The network page 302 may include a user interface portion 304 for requesting 114 the segment 116 as well as a number of other elements, such as information identifying the event venue provider and a link to one or more tools provided by the network page 302. The user interface portion 304 may include a media entry portion 306 for a user 106 to textually enter (if a text box) or select (if a drop-down menu) a media item, such as a movie. The user interface portion 304 may also include a segment details portion 308 for a user 106 to indicate at least a beginning position of the segment 116 within the media item/movie or a time length/duration. Further, the user interface portion 304 may include a segment preferences portion 310 for a user 106 to indicate whether the user 106 prefers to receive a full segment 116 or a summary of the segment 116. The user interface portion 304 may also include a pass acquisition evidence portion 312 for a user 106 to enter pass information, customer rewards card number, or other information or files (e.g., a ticket image). The user interface portion 304 may also include a control, such as a "next" button, to cause submission of the information entered through the user interface portion 304.

Returning to FIG. 1, and as mentioned above, the user 106 may request 114 a segment 116 for a media item associated with an event 112 for which the user 106 has not purchased a ticket 110. Such a segment 116 may be made available for free or for a price to enable the user 106 to preview the media item. In such implementations, the user 106 may provide much of the same information through a user interface as described above, but may not be asked for a ticket number or other evidence of purchase of a ticket. Alternatively, the user interface may simply list one or more predetermined segments 116 that are available for the user 106 to request 114 for a given media item and request selection of a pricing option if applicable to that media item.

In various implementations, after submitting the request 114 and, if applicable, the ticket purchase evidence 118, the user device 104 may receive the requested segment 116 or at least a part of the requested segment 116 (referred to collectively hereinafter as "the segment 116"). The user device 104 may receive the segment 116 as a media stream, playing the stream as it is received and discarding after playback so that a local copy of the segment 116 is not maintained on the user device 104. In other examples, the user device 104 receives and stores a local copy of the segment 116 that is provided with use and storage restrictions. Such restrictions may result in the local copy being deleted after a preset number of viewings or after a preset amount of time. The restrictions may also prevent the user 106 from transmitting or copying the local copy of the segment 116.

As shown in FIG. 1, the service provider devices 102 may include processor(s) 120, network interface(s) 122, and memory 124. The processor(s) 120 may include any one or more central processing units or graphic processing units. The network interface(s) 122 may support both wired and wireless connections to networks, such as cellular networks, radio, WiFi networks, short range networks (e.g., Bluetooth, IR, and so forth.). The memory 124 (and other memories described throughout) is an example of non-transitory computer-readable storage media and may include volatile, nonvolatile memory, and/or other persistent and/or auxiliary non-transitory computer-readable storage media. Thus, the memory 124 may include, but is not limited to, RAM, ROM, EEPROM, flash memory, or other memory technology, or any other medium which can be used to store content, applications for access by a service provider device 102. The memory 124 may store media items 126, policies 128, a network server 130, a verification module 132, a segmentation module 134, and a payments module 136. As described in more detail below, these modules are executed by the processor(s) 120. While the modules and data are shown in FIG. 1 as being stored in a memory of a single computing device, it is to be understood that the modules and data may be distributed among a plurality of local and/or remote computing devices, and/or may be implemented as, or provided by, other web services. Moreover, the memory 124 may be used to store any number of functional modules that are executable on the processors 120, as well as data and items that are rendered by a service provider device 102. Thus, the memory 124 may, for example, store an operating system.

In various implementations, the media items 126 may include any sort of media files, such as video, audio, images, etc. and may be stored in a data store of the service provider devices 102 or of the media provider 138. Media items 126 may include a single type of media file or multiple different types of media files and may be for a single type of event 112 or for multiple types of events 112. The media items 126 may include complete media items 126 (e.g., complete movies, recording of an entire sporting event, etc.), segments of media items 126 (scenes or parts of varying lengths), or summaries of media items 126 or media item segments. The media items 126 may be received from the media provider 138, generated by the segmentation module 134, or some combination of both.

The policies 128 may be set by the media provider 138, by the service provider, or by agreement of the media provider 138 and service provider. The policies 128 may determine what parts of media items are available for delivery as segments 116, maximum time lengths of segments 116, whether summaries or full segments 116 are available for particular parts of a given media item 126, and storage/use restrictions governing whether local storage of a segment 116 by the user device 104 is allowed, and under what circumstances. The policies 128 may also specify whether a ticket purchase is required for viewing of a segment 116 of any length of a particular media item 128 or for viewing a segment 116 of a requested length. Further, the policies may specify prices associated with different segments of different lengths, whether the service provider has rights to generate segments, and any restrictions on lengths of parts of media items 126 that may be included in segments. The policies 128 may be maintained by a data store of the service provider devices 102.

The network server 130 may provide a user interface to the user device 104. For example, the network server 130 may provide a user interface in the form of a network page, such as one of the network pages illustrated by FIGS. 2 and 3. The network server 130 may also receive the request 114 and pass acquisition evidence 118 from the user device 104. Upon receiving the request 114 and pass acquisition evidence 118, the network server 130 may check policies 128 associated with the media item 126 specified in the request 114. If the policies 128 indicate that a pass acquisition is required to provide the requested segment 116, then the network server 130 may invoke the verification module 132 to verify the pass acquisition evidence 118. If the verification module 132 validates the pass acquisition, or if verification is not required, the network server 130 then determines whether payment is required based on the policies 128 and on any subscription that the user 106 may have to services of the service provider. For example, policies 128 may specify that payment is required, but the subscription may cover all or part of that payment. If payment is required, the network server 130 may provide any payment information included in the request 114 to the payments module 136 for processing. If payment information is not included in the request 114 but is required by the policies 128, the network server 130 may serve a network page to the user device 104 requesting payment information and may provide the received payment information to the payments module 136. Upon receiving confirmation of payment, if payment is required by the policies 128, the network server 130 queries the data store of the media items 126 to determine whether the data store includes the requested segment 116. If the data store includes the requested segment 116, the network server 130 serves the segment 116 to the user device 104. If the data store does not include the requested segment 116, but the policies 128 allow the service provider to generate all or part of the segment 116, the network server 130 may invoke the segmentation module 134, receive the segment 116 or part of the segment 116 from the segmentation module 134, and serve the segment 116/part of the segment 116 to the user device 104.

The verification module 132 may be invoked by the network server 130 and provided with pass acquisition evidence 118. Such evidence may include pass information (e.g., a ticket number), a customer rewards card number, information obtained from scanning an identifier of the pass 110. If the pass acquisition evidence 118 is an image, the verification module 132 may perform image analysis on the image or invoke another module to perform the analysis, and may extract information based on the analysis. If the pass 110 was sold by another party, the verification module 132 may interface with a system of the other party, providing the pass acquisition evidence 118 or information extracted from the pass acquisition evidence 118 to that system and receiving, in response, an indication of whether the pass acquisition evidence 118 or extracted information is valid. If the pass 110 was sold by the service provider, the verification module 132 may compare the pass acquisition evidence 118 or extracted information to purchase data maintained by the service provider and receive, in response, an indication of whether the pass acquisition evidence 118 or extracted information is valid. In some implementations, if the pass 110 is sold by the service provider, the user 106 need only log into an account with the service provider, and the verification module 132 can obtain the pass acquisition evidence 118 from information maintained by the service provider. In such implementations, there is no need for the user device 104 to provide the pass acquisition evidence 118.

In various implementations, the segmentation module 134 may generate the segment 116 from the media items 126 based on the policies 128. Based on those policies 128, the segmentation module 134 may generate the segment 116 or a part of the segment 116 for the network server 130 to provide to the user device 104. The segmentation module 134 may operate based on metadata provided with the media items, selecting the segment 116 or part based on, e.g., time stamps, scene markers, etc. If generating a summary of a media item 126, the segmentation module 134 may utilize the metadata to determine significant frames or parts of that media item 126. The segmentation module 134 may generate segments 116 or parts of segments 116 in response to invocation by the network server 130 and may provide those segments 116/parts of segments to the network server 130 and to the data store for media items 126. Also or instead, the segmentation module 134 may independently generate one or more segments 116 for a media item 126 and store the one or more segments 116 in the data store for media items 126.

In further implementations, the payments module 136 may be invoked by the network server 130 to process payment information received from the user device 104. The payments information may then be provided by the payments module 136 to a third party payment service which will, in return, indicate to the payments module 136 whether payment was successful. The payments module 136 then indicates success or failure to the network server 130. In some implementations, because the user 106 subscribes to a service of the service provider or is a rewards customer of the service provider, no payment is required, but the payments module 136 is invoked to update account information for the user 106 to indicate that the segment 116 was provided. In other implementations, a ticket for the event for which the user has requested a segment 116 is not subject to a monetary charge, and thus, no payment is required (but the payments module 136 is invoked to update account information).

In some instances, the service provider devices 102 may have features or functionality in addition to those that FIG. 1 illustrates. For example, the computing device(s) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the computing device(s) may reside remotely from the computing device(s). In such implementations, the computing device(s) may utilize the network interfaces 122 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of non-transitory computer readable media.

In further implementations, the media provider 138 may be any entity providing the media items 126 or policies 128 to the service provider. For example, the media provider 138 may be a movie production company, distribution company, or movie theater. The media provider 138 may provide the media items 126 as any or all of entire media items 126, as segments of media items 126, as summaries of media items 126, or as summaries of segments of media items 126. Also, or instead, the media provider 138 may provide the service provider with rights to generate one or both of segments of media items 126 or summaries of media items 126/segments of media items 126. These rights may be specified in the policies 128. The policies 128 may also specify whether segments of media items 126 are to be streamed or locally stored. Further, the policies 128 may specify restrictions on a number of viewings or duration associated with local storage.

Figure 4:
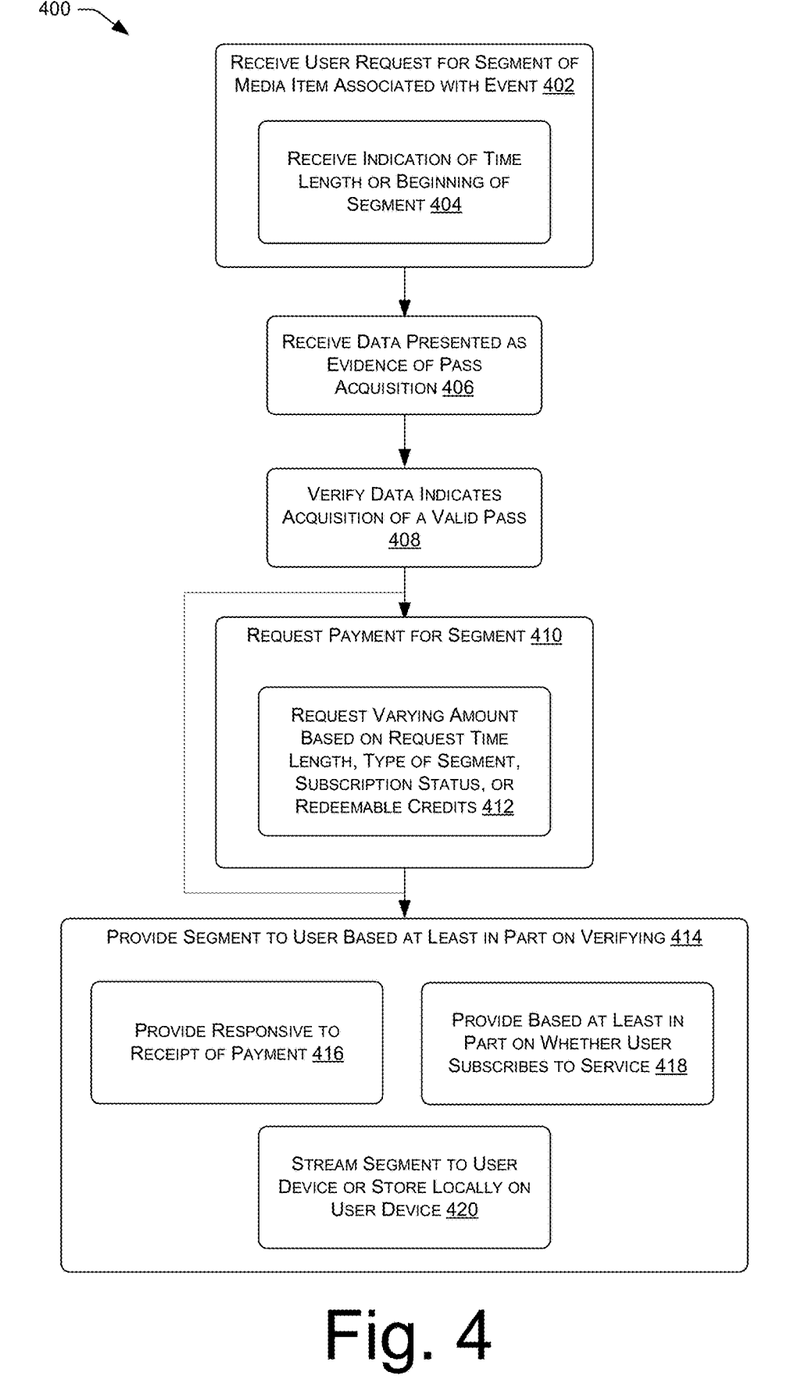
FIG. 4 shows an illustrative process for receiving a request for a segment of a media item associated with an event, for receiving data presented as evidence of acquisition of a pass for the event, for verifying that data, and, based at least in part on the verifying, providing the segment of the media item.
Figure 5:
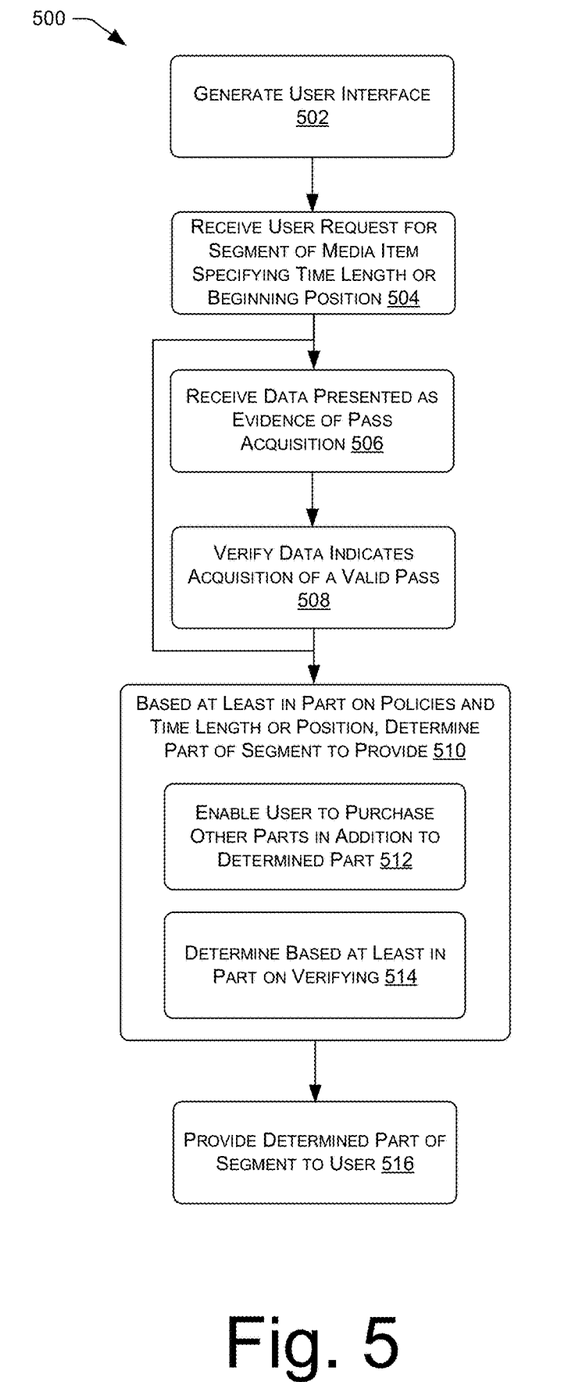
FIG. 5 shows an illustrative process for receiving a request for a segment of a media item associated with an event, the request specifying a time length or beginning position, determining at least a part of the segment to provide based on the time length or beginning position, and providing the part of the segment of the media item.

FIGS. 4 and 5 illustrate example processes. These processes (as well as each process described herein) are illustrated as logical flow diagrams, each operation of which represents a sequence of operations that can be implemented in hardware or in software implemented by hardware. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates an example process 400 for receiving a request for a segment of a media item associated with an event, for receiving data presented as evidence of acquisition of a pass for the event, for verifying that data, and, based at least in part on the verifying, providing the segment of the media item. The process 400 includes, at 402, receiving, by one or more computing devices, a request from a user device for a segment of a media item. The media item may be associated with an event. Examples of media items and corresponding events include movies and movie showings, songs and concerts, or recordings of sporting events and sporting events, to name a few. The segment may be a beginning part of the media item or a summary of a part of the media item.

At 404, the receiving may include receiving, with the request, indications of at least one of a time length for the segment or a beginning position for the segment within the media item. In some implementations, the segment may be taken from a summary for the entire media item based on a requested time length for the segment.

At 406, the one or more computing devices may also receive from the user device, as part of the request or separately, data presented as evidence of acquisition of a valid pass for the event. In some implementations, the received data may be user credentials associated with a customer rewards card. In further implementations, the received data may be an identifier such as a textual code, a bar code, or an image of at least a portion of a ticket.

At 408, the one or more computing devices may verify that the data is associated with a purchase of a pass for the event. If the data is an image, the verifying may include performing image analysis on the image or invoking another module to perform the analysis, and may extract information based on the analysis. The verifying may also or instead include interfacing with a system of another party or comparing the data or extracted information to purchase data maintained by the service provider.

At 410, the one or more computing devices may request payment for the segment. In some embodiments, a previously established form of payment may be used to pay for the segment, such as the form of payment used to acquire the pass for the original event.

At 412, the requesting may comprise varying the amount requested based at least in part on a time length requested for the segment, on whether the segment is a summary, on whether the user of the user device subscribes to a service, or on whether the user has redeemable credits.

At 414, the one or more computing devices may provide the segment of the media item to the user device based at least in part on the verifying. Various techniques may be used to provide the segment, as discussed in turn. At 416, the providing may also be performed in response to receipt of payment. At 418, the providing may also or instead be performed based at least in part on whether the user subscribes to a service. At 420, the providing may comprise streaming the segment to a user device or storing the segment locally on a user device with restrictions on a number or views or on a storage duration.

FIG. 5 illustrates an example process 500 for receiving a request for a segment of a media item associated with an event, the request specifying a time length or beginning position, determining at least a part of the segment to provide based on the time length or beginning position, and providing the part of the segment of the media item. The process 500 includes, at 502, generating a user interface to be presented on a user device associated with the user making the request for the segment.

At 504, the one or more computing devices may receive a request from a user device for a segment of a media item associated with an event. The request may specify at least one of a time length for the segment or beginning position for the segment within the media item.

At 506, the one or more computing devices may also receive from the user device, as part of the request or separately, data presented as evidence of acquisition of a valid pass for the event. In some implementations, the received data may be user credentials associated with a customer rewards card. In further implementations, the received data may be an identifier, such as a textual code, a bar code, or an image of at least a portion of a ticket.

At 508, the one or more computing devices may verify that the data is associated with a purchase of a pass for the event. If the data is an image, the verifying may include performing image analysis on the image or invoking another module to perform the analysis, and may extract information based on the analysis. The verifying may also or instead include interfacing with a system of another party or comparing the data or extracted information to purchase data maintained by the service provider.

At 510, the one or more computing devices may determine, based at least in part on the request and on a policy for a time length or position of segments, a part of the requested segment of the media item to provide. At 512, the determining may include enabling the user to purchase other parts of the requested segment in addition to the determined part. The determined part of the requested segment may be the entire requested segment, a summary of the requested segment, or a beginning part of the requested segment. At 514, the determining may be performed based at least in part on the verifying.

At 516, the one or more computing devices may provide the determined part of the requested segment of the media item. If other parts are purchased, the providing may also include providing the other parts.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving, from a computing device, a request for a segment of a media item;
    determining, based at least in part on receiving the request, a policy associated with determining segments of the media item;
    determining that the request satisfies the policy;
    determining, based at least in part on the request satisfying the policy, segment data corresponding to a summary of the segment;
    determining, based at least in part on the policy, one or more conditions associated with the segment data being played on the computing device, the one or more conditions including at least a number of times the segment data is permitted to be played at the computing device; and
    sending, to the computing device:
        the segment data corresponding to the summary of the segment; and
        the one or more conditions including the at least the number of times the segment data is permitted to be played at the computing device.

2. The method of claim 1, wherein the one or more conditions further include an amount of time the computing device is permitted to play the segment data after the computing device receives the segment data.

3. The method of claim 1, further comprising causing at least one of:
    the segment data to be deleted from the computing device based at least in part on a predetermined amount of time lapsing since sending the segment data to the computing device; or
    the segment data to be deleted from the computing device based at least in part on the segment data being played by the computing device a threshold number of times.

4. The method of claim 1, further comprising preventing the computing device from at least one of:
    transmitting the segment data to one or more additional computing devices; or
    copying the segment data onto memory of the computing device or the one or more additional computing devices.

5. The method of claim 1, wherein:
    the computing device is configured to play the segment data based at least in part on the one or more conditions being satisfied; and
    the segment data is rendered unplayable at the computing device based at least in part on the one or more conditions not being satisfied.

6. The method of claim 1, wherein:
    the request includes:
        a time length for the segment corresponding to a beginning position for the segment and an ending position for the segment; and
        an indication to generate the summary of the segment between the beginning position of the segment and the ending position of the segment; and
    determining the segment data comprises determining one or more highlights between the beginning position of the segment and the ending position of the segment, the one or more highlights being identified based at least in part on metadata stored in association with the media item that indicates at least one of the one or more highlights.

7. One or more non-transitory computer-readable media storing computer executable instructions that, when operated by a processor, perform operations comprising:
 receiving, from a computing device, a request for a segment of a media item;
 determining a policy associated with determining segments for the media item;
 determining that the request satisfies the policy;
 determining, based at least in part on the request satisfying the policy, segment data corresponding to a summary of the segment; and
 sending, to the computing device, the segment data corresponding to the summary of the segment and one or more conditions associated with the computing device playing the summary of the segment, wherein computing device is configured to play the summary of the segment based at least in part on a determination that the one or more conditions are satisfied.

8. The one or more non-transitory computer-readable media of claim 7, wherein sending the segment data comprises sending the segment data with restrictions on at least one of:
 streaming the summary of the segment at the computing device;
 storing the summary of the segment locally on the computing device; or
 transmitting the summary of the segment to one or more additional computing devices.

9. The one or more non-transitory computer-readable media of claim 7, wherein the one or more conditions include:
 a predetermined number of times the summary of the segment is permitted to be played at the computing device; or
 an amount of time the summary of the segment is permitted to be played by the computing device since the sending the segment data to the computing device.

10. The one or more non-transitory computer-readable media of claim 7, wherein sending the segment data comprises sending the segment data with an instruction for the computing device to delete the segment data based at least in part on at least one of:
 the summary of the segment being played a predetermined number of times; or
 the computing device being provided the summary of the segment for a threshold amount of time.

11. The one or more non-transitory computer-readable media of claim 7, the operations further comprising causing:
 a first user interface to be displayed on the computing device that prompts a user of the computing device to select the media item for determining the summary of the segment;
 a second user interface to be displayed on the computing device that prompts the user to specify a beginning position of the segment and an ending position of the segment;
 a third user interface to be displayed on the computing device that prompts the user to specify to generate the summary of the segment; and
 a fourth user interface to be displayed on the computing device that prompts the user to provide at least one of:
  evidence that the user purchased a pass associated with the media item; or
  subscriber information for obtaining the media item.

12. The one or more non-transitory computer-readable media of claim 7, wherein computing device is configured to cause the summary of segment to be unplayable based at least in part on a second determination that the one or more conditions are not satisfied.

13. The one or more non-transitory computer-readable media of claim 7, the operations further comprising:
 receiving a first indication associated with the computing device playing the summary of the segment;
 determining that the summary of the segment is permitted to be played by the computing device; and
 sending a second indication to the computing device that causes the computing device to play the summary of the segment.

14. A system comprising:
 a database storing media data associated with a media item;
 an electronic data store configured to store computer executable instructions; and
 a computing device including a processor, the computing device being in communication with the electronic data store and configured to execute the computer executable instructions to perform acts comprising:
  receiving, over a wireless network from a user device, a request for a segment of the media item;
  determining a policy associated with determining segments of the media item;
  determining, in accordance with the policy:
   segment data that represents a portion of the media data corresponding to the segment; and
   one or more conditions corresponding to a playback of the segment at the user device; and
  sending, over the wireless network, to the user device, the segment data corresponding to the segment, wherein the user device is configured to play the segment based at least in part on the one or more conditions corresponding to the playback of the segment being satisfied.

15. The system of claim 14, wherein:
 the one or more conditions comprise at least one of:
  a number of times the segment is permitted to be played back at the user device; or
  an amount of time the segment is permitted to be played back at the user device since the user device received the segment; and
 the user device is configured to play the segment based at least in part on at least one of:
  the segment being viewed less than the number of times; or
  the user device receiving the segment less than the amount of time.

16. The system of claim 14, the acts further comprising:
 generating, in accordance with the policy, usage data that represents usage rights for the user device to at least one of:
  store the segment locally on the user device;
  send the segment to one or more additional user devices; or
  copy the segment; and
 sending, over the wireless network, the usage data to the user device.

17. The system of claim 14, wherein the user device is configured to disable the playback of the segment based at least in part on the one or more conditions not being satisfied.

18. The system of claim 14, wherein the user device is configured to cause the playback of the segment to be disabled based at least in part on at least one of:
- the segment being viewed a threshold number of times at the user device; or
- a threshold amount of time lapsing since sending the segment data to the user device.

19. The system of claim 14, wherein:
the request includes:
- a first indication associated with a beginning position of the segment;
- a second indication associated with an ending position of the segment; and
- a third indication to generate a summary of the segment between the beginning position and the ending position; and the acts further comprise:
- determining one or more highlights between the beginning position of the segment and the ending position of the segment; and
- determining the summary of the segment based at least in part on the one or more highlights.

20. The system of claim 14, the acts further comprising sending, over the wireless network, to the user device, an instruction that causes at least one of:
- the segment to be unplayable at the user device;
- the segment to be disabled at the user device; or
- the segment data to be deleted from the user device.

\* \* \* \* \*